United States Patent [19]

Stephany

[11] Patent Number: 5,550,609
[45] Date of Patent: * Aug. 27, 1996

[54] FILM CARTRIDGE WITH FILM MOVEMENT INDICATOR, AND ASSOCIATED INDICATOR SENSING DEVICE

[75] Inventor: Thomas M. Stephany, Churchville, N.Y.

[73] Assignee: Eastman Kodak Company, Rochester, N.Y.

[*] Notice: The portion of the term of this patent subsequent to Dec. 19, 2014, has been disclaimed.

[21] Appl. No.: 368,462

[22] Filed: Jan. 4, 1995

[51] Int. Cl.⁶ .............................. G03B 17/26; G03B 7/00
[52] U.S. Cl. .............................................. 354/275; 354/21
[58] Field of Search ................... 354/21, 275; 242/344, 242/357

[56] References Cited

U.S. PATENT DOCUMENTS

| | | | |
|---|---|---|---|
| 3,364,832 | 1/1968 | Engelsmann et al. | 354/202 |
| 3,670,638 | 6/1972 | Lindsay | 354/275 |
| 4,887,110 | 12/1989 | Harvey | 354/275 |
| 5,264,886 | 11/1993 | Byrd | 354/275 |

*Primary Examiner*—David M. Gray
*Assistant Examiner*—Eddie C. Lee
*Attorney, Agent, or Firm*—Roger A. Fields

[57] ABSTRACT

A film cartridge has a folded-over tab protruding from a film egress slot in the form of a loop to be unfolded by a film leader moving outwardly through the slot and an electrically conductive patch located on the loop to be accessible for sensing only when the loop is unfolded. A sensor in a photographic camera or other film handling apparatus is positioned to detect the patch only when the loop is unfolded.

5 Claims, 3 Drawing Sheets

FILM CARTRIDGE WITH FILM MOVEMENT INDICATOR, AND ASSOCIATED INDICATOR SENSING DEVICE

CROSS-REFERENCE TO RELATED APPLICATION

Reference is made to commonly assigned copending application Ser. No. 08/368,508, entitled FILM CARTRIDGE WITH EXPOSED-FILM INDICATOR and filed Jan. 3, 1995 in the name of Thomas M. Stephany, which is assigned to the assignee of this application.

FIELD OF THE INVENTION

The invention relates generally to the field of photography, and in particular to film cartridges. More specifically, the invention relates to a film cartridge with a film movement indicator, and to an indicator sensing device for use in a photographic camera or other film handling apparatus.

BACKGROUND OF THE INVENTION

Prior art U.S. Pat. No. 5,296,887, issued Mar. 22, 1994, discloses a film cartridge comprising a cartridge shell having a film egress slot, a filmstrip located inside the cartridge shell with a film leader to be moved outwardly through the film egress slot, and film exposure status indicating means. The film exposure status indicating means includes a plurality of icon windows or cut-outs in the cartridge shell which are uniquely shaped to be different from each other in order for one of the icon windows to denote the filmstrip is fresh or unexposed and for another of the icon windows to denote the filmstrip is exposed or used, and an indicator flag rotatably supported to be visible through only one of the icon windows at a time to highlight the particular window that indicates the current exposure status of the filmstrip. When the indicator flag is advanced from the film-unexposed window to the film-exposed window, it provides some indication of film movement.

SUMMARY OF THE INVENTION

According to one aspect of the invention there is provided a film cartridge comprising a cartridge shell having a film egress slot, a filmstrip located inside the cartridge shell with a film leader to be moved outwardly through the film egress slot, and a film movement indicator, characterized in that:

the film movement indicator includes folded-over resilient means partly protruding from the film egress slot in the form of a loop to be unfolded by the film leader as the film leader is moved outwardly from the film egress slot, and a sensible indicator patch located on the loop to be accessible for sensing only when the loop is unfolded.

According to another aspect of the invention there is provided a sensing device intended to be used with a film cartridge having a folded-over tab protruding from a film egress slot in the form of a loop to be unfolded by a film leader moving outwardly through the slot and an electrically conductive patch located on the loop to be accessible only when the loop is unfolded, comprising:

a sensor positioned to detect the patch only when the loop is unfolded.

DETAILED DESCRIPTION OF THE INVENTION

The invention is disclosed as being embodied preferably in a 35 mm film cartridge and photographic camera. Because the features of a 35 mm film cartridge and photographic camera are generally known, the description which follows is directed in particular only to those elements forming part of or cooperating directly with the disclosed embodiment. It is to be understood, however, that other elements may take various forms known to a person of ordinary skill in the art.

Figure 1:
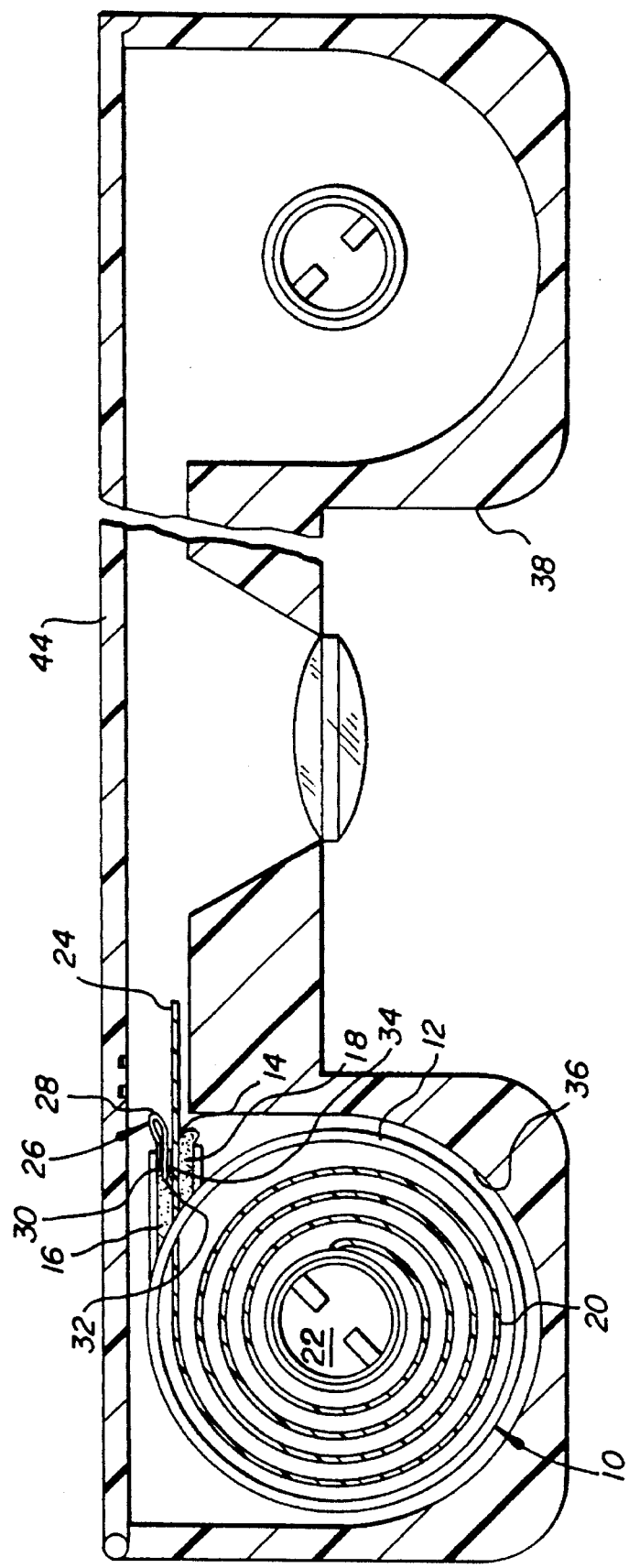
FIG. 1 is a cross-section view of a film cartridge with a film movement indicator, and a photographic camera in which the film cartridge is loaded, according to a preferred embodiment of the invention, showing the film movement indicator in an original concealed position before any film movement.
Figure 2:
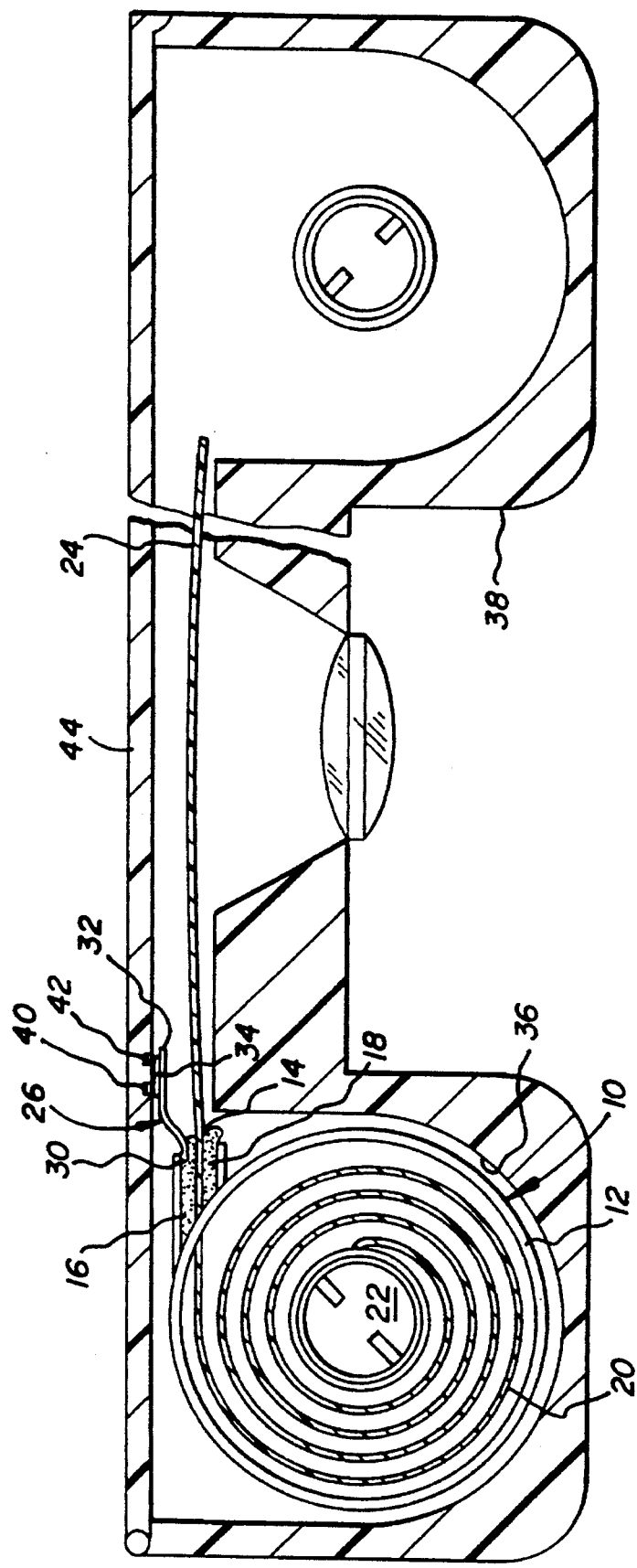
FIG. 2 is a cross-section view similar to FIG. 1, showing the film movement indicator in an indicating position after some film movement.

Referring now to the drawings, FIGS. 1 and 2 show a film cartridge 10 comprising a cartridge shell 12 having a film egress slot 14 lined with a pair of upper and lower light-trapping plush pads 16 and 18, and a filmstrip 20 coiled into a film roll about a film spool 22 rotatably supported inside the cartridge shell. The filmstrip 20 has an integral film leader 24 partly located inside the slot 14 between the upper and lower plush pads 16 and 18 and partly protruding from the slot as shown in FIG. 1. As is well known, the filmstrip 20 beginning with the film leader 24 is moved outwardly through the slot 14 to expose successive film frames in a photographic camera.

A folded-over resilient tab 26 partly protrudes from the slot 14 in the form of an external loop 28 with one end portion 30 secured in place inside the slot between the upper plush pad 16 and the cartridge shell 12 and another end portion 32 inside the slot between the upper plush pad and the film leader 24. See FIG. 1. The free end portion 32 of the tab 26 is free to be frictionally dragged by the film leader 24 from inside to outside the slot 14 to unfold the loop 28 as the film leader is moved outwardly from the slot. See FIG. 2. Thus, the loop 28 when originally folded provides a visible indication that the filmstrip 20 is fresh or unexposed and when unfolded provides a visible indication that the filmstrip is exposed or used.

The tab 26 has an electrically conductive patch 34 located on its free end portion 32. Thus, when the free end portion 32 of the tab 26 is positioned inside the slot 14 as shown in FIG. 1, the patch 34 is concealed or not accessible. Conversely, as shown in FIG. 2, when the free end portion 32 of the tab 26 is dragged outside the slot 14 by the film leader 24 moving outwardly from the slot, and the loop 28 is unfolded, the patch 34 is made readily accessible and therefore can be easily sensed electronically to indicate film movement.

Figure 3:
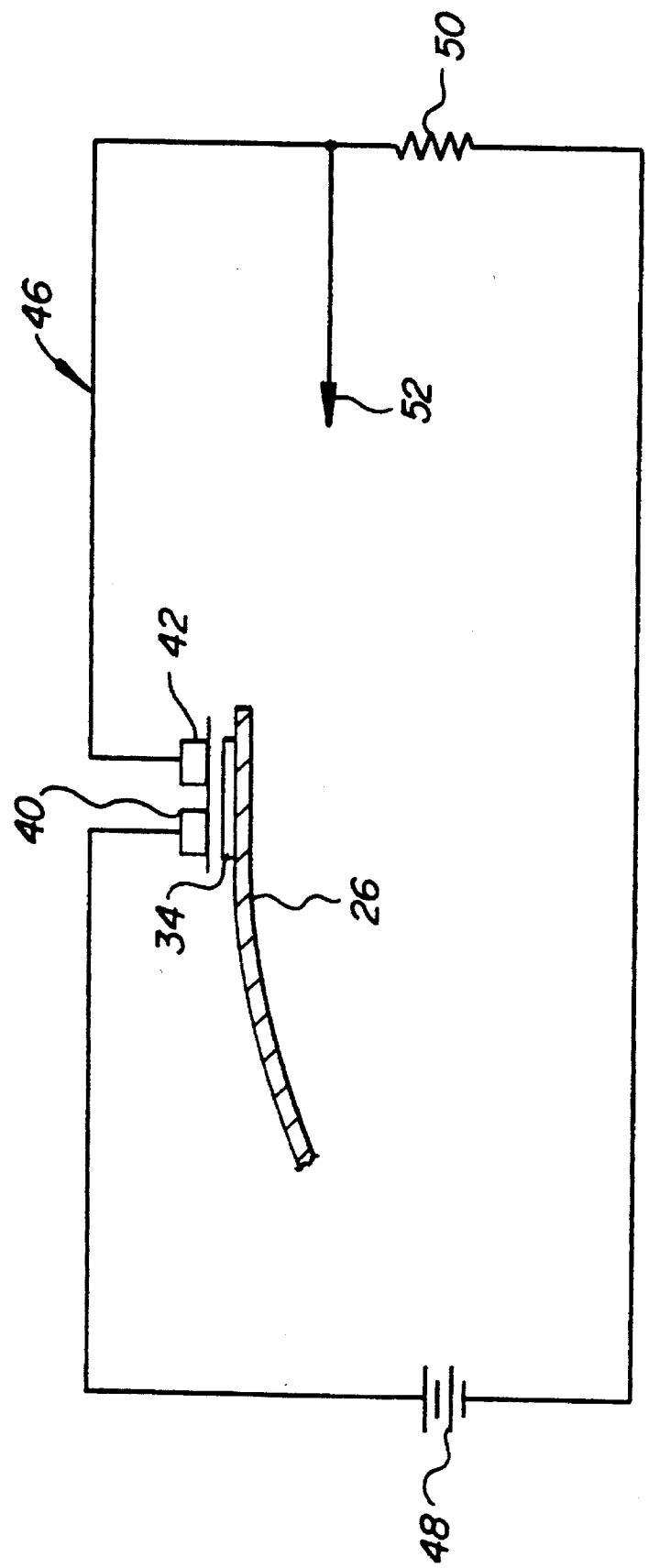
FIG. 3 is a schematic diagram of a sensing circuit in the photographic camera for detecting the film movement indicator in its indicating position.

FIGS. 1 and 2 show the film cartridge loaded in a supply chamber 36 of a camera body 38. When the film leader 24 is moved outwardly from the slot 14 and the loop 28 is unfolded, the patch 34 on the free end portion 32 of the tab 26 is positioned momentarily against a pair of spaced electrical contacts 40 and 42 to bridge the contacts. See FIG. 2. The two contacts 40 and 42 are embedded in a rear door 44 pivotally connected to the camera body 38, and they are included in a commonplace sensing circuit 46 which is schematically shown in FIG. 3. The sensing circuit 46 has a battery 48, a voltage-drop resistor 50, and a voltage terminal 52. Thus, when the two contacts 40 and 42 are bridged by the patch 34, the circuit 46 is effectively closed and a voltage signal indicating film movement is provided at the terminal 52

The invention has been described with reference to a preferred embodiment. However, it will be appreciated that variations and modifications can be effected by a person of ordinary skill in the art without departing from the scope of the invention.

PARTS LIST 10. film cartridge
12. cartridge shell
14. film egress slot
16. upper plush pad
18. lower plush pad
20. filmstrip
22. film spool
24. film leader
26. folded-over tab
28. tab loop
30. secured tab end portion
32. free tab end portion
34. electrically conductive patch
36. supply chamber
38. camera body
40. electrical contact
42. electrical contact
44. rear door
46. sensing circuit
48. battery
50. voltage-drop resistor
52. voltage terminal

I claim:

1. A film cartridge comprising a cartridge shell having a film egress slot, a filmstrip located inside said cartridge shell and adapted to be moved outwardly through said film egress slot, and a film movement indicator, is characterized in that:

said film movement indicator includes an electrically conductive indicator patch which is separate from said filmstrip and located in said film egress slot, but is moved outwardly from the film egress slot by the filmstrip as the filmstrip is similarly moved, to provide an electrically sensible indication of film movement once outside the cartridge shell.

2. A film cartridge comprising a cartridge shell having a film egress slot, a filmstrip located inside said cartridge shell with a film leader to be moved outwardly through said film egress slot, and a film movement indicator, is characterized in that:

said film movement indicator includes folded-over resilient means partly protruding from said film egress slot in the form of a loop to be unfolded by said film leader as the film leader is moved outwardly from the film egress slot, and a sensible indicator patch located on said loop to be accessible for sensing only when the loop is unfolded.

3. A film cartridge comprising a cartridge shell having a film egress slot, a filmstrip located inside said cartridge shell with a film leader to be moved outwardly through said film egress slot, and a film movement indicator, is characterized in that:

said film movement indicator includes a folded-over resilient tab partly protruding from said film egress slot in the form of a loop with one end portion held in place inside the film egress slot and another end portion inside the film egress slot which is free to be dragged by said film leader to unfold said loop as the film leader is moved outwardly from the film egress slot, and a sensible indicator patch located on said free end portion of the loop to prevent said indicator patch from being sensed before the loop is unfolded.

4. A film cartridge comprising a cartridge shell having a film egress slot, a filmstrip located inside said cartridge shell with a film leader to be moved outwardly through said film egress slot, and a film movement indicator, in combination with an indicator sensing device intended to be used with said film cartridge, characterized in that:

said film movement indicator includes folded-over resilient means partly protruding from said film egress slot in the form of a loop to be unfolded by said film leader as the film leader is moved outwardly from the film egress slot, and a sensible indicator patch located on the loop to be accessible for sensing only when the loop is unfolded; and said sensing device includes sensor means for detecting said indicator patch only when said loop is unfolded.

5. A sensing device intended to be used with a film cartridge having a folded-over tab protruding from a film egress slot in the form of a loop to be unfolded by a film leader moving outwardly through the slot and an electrically conductive patch located on the loop to be accessible for sensing only when the loop is unfolded, comprising:

a sensor to detect the patch; and means positioning said sensor to detect the patch only when the loop is unfolded.

* * * * *